UNITED STATES PATENT OFFICE.

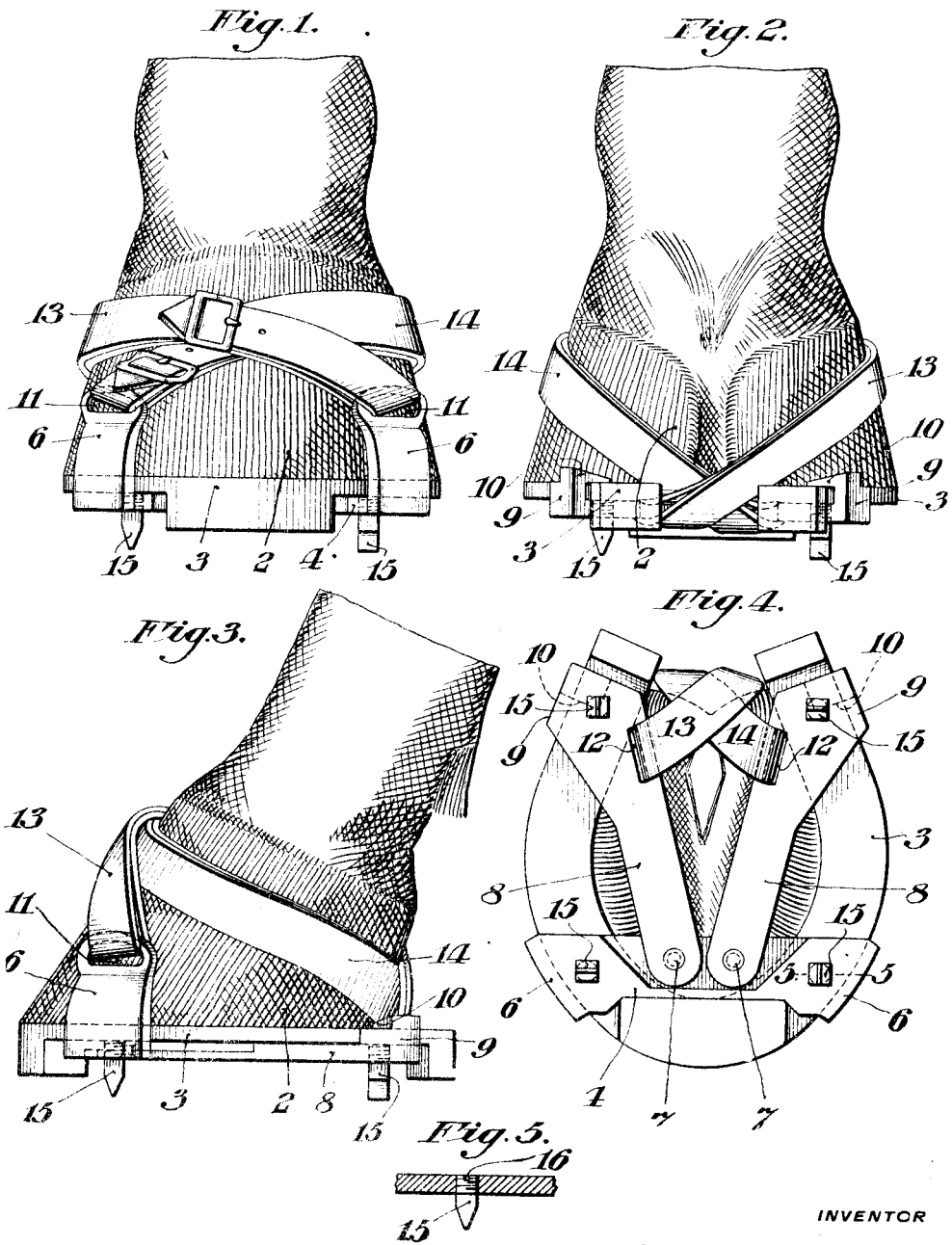

SEIKICHI NORO, OF GLADWYNE, PENNSYLVANIA.

ATTACHMENT FOR HORSESHOES.

1,034,820.

Specification of Letters Patent.   Patented Aug. 6, 1912.

Application filed April 10, 1912. Serial No. 689,727.

*To all whom it may concern:*

Be it known that I, SEIKICHI NORO, a subject of the Emperor of Japan, residing at Gladwyne, in the county of Montgomery and State of Pennsylvania, have invented certain new and useful Improvements in Attachments for Horseshoes, of which the following is a specification.

This invention relates to attachments for horseshoes, adapted to be applied to a shoe on the hoof of a horse to prevent the animal from slipping on icy roads.

The principal object of the invention is to provide an attachment of novel, simple and efficient construction embodying a cross-bar having rearwardly-extending arms pivoted thereto, said bar and arms being provided with projections adapted to engage the horseshoe, in combination with a pair of straps connected and arranged relatively to the bar and arms so that the straps may extend around opposite sides of the hoof and draw the rearward ends of said arms toward each other to cause said projections to firmly engage the shoe and retain the attachment in place.

With this and other objects in view the invention consists in the novel construction and combinations of parts hereinafter fully described and claimed.

In the accompanying drawings, illustrating my invention: Figure 1, is a front elevation of a horse's hoof, a shoe thereon and my improved attachment applied thereto. Fig. 2, is a rear elevation of the parts shown in Fig. 1. Fig. 3, is a side elevation of the parts shown in Fig. 1. Fig. 4, is a bottom view of the parts shown in Fig. 1. Fig. 5, is a section, on line 5—5 of Fig. 4 showing the manner of applying one of the calks to a part of the attachment.

Referring to the drawings, 2 designates a horse's hoof and 3 a horseshoe secured thereto.

The construction of my improved attachment is as follows: 4 designates a cross-bar adapted to extend beneath the forward portion of the horseshoe 3. The ends of the bar 4 are provided with upwardly and inwardly extending projections 6 adapted to the outer faces of the sides of the forward portion of the horseshoe 3 and the superposed hoof 2, as shown. Pivoted side by side to the central portion of the bar 4, at 7, are the forward ends of arms 8 which diverge rearwardly from the pivots 7 and are movable thereon toward and from each other. The outer portions of the rearward ends of the arms 8 are provided with upwardly extending projections 9 adapted to engage the outer faces of the sides of the end portions of the horseshoe 3; and the projections 9 are provided with inwardly-extending parts 10 which extend over the tops of the end portions of the horseshoe 3. The upper ends of the projections 6 are provided with strap-receiving eyes 11; and the inner sides of the rearward portions of the arms 8 are provided with strap-receiving eyes 12, as shown. Extending through the eyes 11 and 12 on one side of the attachment is a strap 13 and extending through the eyes 11 and 12 on the other side of the attachment is a strap 14. Each strap 13 and 14 is provided with a suitable buckle by means of which the parts of the strap extending between the eyes 11 and 12 may be shortened to hold the attachment in place upon the horseshoe, as will be presently explained. Screwed into the bar 4 and arms 8 from the bottom and in the positions shown are calks 15. The parts of the calks directly beneath the bottoms of the bar 4 and arms 8 are made square to provide a shoulder to engage the bottoms of the bar 4 and arms 8 and limit the extent to which the round, screw-threaded ends of the calks may be screwed into the parts 4 and 8. The upper or inner ends of the calks 15 have grooves 16 formed therein to receive a suitable tool to permit the screw-threaded ends of the calks to be removed from the parts 4 and 8 should the lower portions of the calks be broken off.

When the parts of the attachment are applied to a horse's foot, as shown in the drawings, the strap 13 extends around one side of the hoof 2 and the strap 14 extends around the other side of the hoof 2, the straps crossing in front and also at the back of the hoof. It will thus be seen that by tightening the straps 13 and 14 the rearward ends of the arms 8 will be drawn rearwardly and toward each other thereby drawing the projections 6 and 9 firmly against the horseshoe and the upper portions of the projections 6 against the hoof 2. The inwardly extending parts 10 and the upper portions of the projections 6 together with the clamping action of the projections 6 and 9 under the influence of the straps 13 and 14 firmly hold the attachment in place.

I claim:

1. In an anti-slipping attachment for horseshoes, the combination of a cross-bar adapted to extend beneath a horseshoe and having upwardly-extending projections on the ends thereof adapted to engage the outer faces of the sides of the forward portion of the horseshoe, a pair of arms having their forward ends pivoted to said bar and having upwardly-extending projections on their rearward ends adapted to engage the outer faces of the sides of the end portions of the horseshoe, a strap engaged with the rearward portion of one of said arms and one of said projections on said bar, and a strap engaged with the rearward portion of the other of said arms and the other of said projections on said bar, said straps being adapted to extend around opposite sides of a horse's hoof to draw the rearward portions of said arms toward each other.

2. In an anti-slipping attachment for horseshoes, the combination of a cross-bar adapted to extend beneath a horseshoe and having upwardly-extending projections on the ends thereof adapted to engage the outer faces of the sides of the forward portion of the horseshoe, a pair of arms having their forward ends pivoted to said bar and having upwardly-extending projections on their rearward ends adapted to engage the outer faces of the sides of the end portions of the horseshoe, the last named projections having inwardly extending parts adapted to extend over the top of the sides of the end portions of the horseshoe, a strap engaged with the rearward portion of one of said arms and one of said projections on said bar, and a strap engaged with the rearward portion of the other of said arms and the other of said projections on said bar.

3. In an anti-slipping attachment for horseshoes, the combination of a cross-bar adapted to extend beneath a horseshoe and having upwardly-extending projections on the ends thereof adapted to engage the outer faces of the sides of the forward portion of the horseshoe, the upper ends of said projections being provided with strap-receiving eyes, a pair of arms having their forward ends pivoted to said bar and having upwardly-extending projections on their rearward ends adapted to engage the outer faces of the sides of the end portions of the horseshoe, the rearward portions of said arms being provided with strap-receiving eyes, a strap extending through the eye of one of said arms and the eye of one of said projections on said bar, and a strap extending through the eye of the other of said arms and the eye of the other of said projections on said bar, said straps being adapted to extend around opposite sides of a horse's hoof to draw the rearward portions of said arms toward each other.

In testimony whereof I affix my signature in presence of two witnesses.

SEIKICHI NORO.

Witnesses:
S. I. HARPER,
A. V. GROUPE.